United States Patent [19]

Blonder et al.

[11] Patent Number: 4,995,686
[45] Date of Patent: Feb. 26, 1991

[54] OPTICAL SPLITTER/COMBINER WITH AN ADIABATIC MIXING REGION

[75] Inventors: Greg E. Blonder, Summit; Lee L. Blyler, Jr., Basking Ridge, both of N.J.; Gary J. Grimes, Thornton, Colo.

[73] Assignee: AT&T Bell Laboratories, Murray Hill, N.J.

[21] Appl. No.: 455,723

[22] Filed: Dec. 22, 1989

[51] Int. Cl.⁵ .................... G02B 6/26; G02B 6/28; G02B 6/36
[52] U.S. Cl. ..................... 350/96.15; 350/96.16; 350/96.20
[58] Field of Search ............. 350/96.15, 96.16, 96.20, 350/96.21

[56] References Cited

U.S. PATENT DOCUMENTS

| | | | |
|---|---|---|---|
| 3,756,688 | 9/1973 | Hudson et al. | 350/96 WG |
| 3,874,781 | 4/1975 | Thiel | 350/96 C |
| 4,169,656 | 10/1979 | Hodge | 350/96.15 |
| 4,198,118 | 4/1980 | Porter | 350/96.16 |
| 4,212,512 | 7/1980 | Hodge | 350/96.15 |
| 4,484,794 | 11/1984 | Witte | 350/96.16 |
| 4,824,204 | 4/1989 | Pafford | 350/96.22 |
| 4,913,508 | 4/1990 | Blyler, Jr. et al. | 350/96.16 |
| 4,915,469 | 4/1990 | Byron et al. | 350/96.16 |

Primary Examiner—Akm Ullah
Attorney, Agent, or Firm—John C. Moran

[57] ABSTRACT

An optical splitter/combiner having an adiabatic mixing region for optically interconnecting a plurality of optical fibers. The change in shape of the adiabatic mixing region is purposely gradual so as to introduce little optical loss. The shape of the adiabatic mixing region is varied so as to minimize the change in the cross-sectional area of the adiabatic mixing region. The optical splitter/combiner is fabricated by the utilizing two subassemblies which when fitted together form the adiabatic mixing region. This formed mixing region is adapted to accepting a linear array of optical fibers in one end and a single optical fiber in the other end. The core area of the optical fibers in one end is not necessarily equivalent to those of the other end but instead are sized to ensure the relatively efficient transfer of optical energy. The adiabatic mixing region is filled with resin, and the numerical apertures of the optical fibers and the resin-filled mixing region are substantially matched. The subassemblies form an optical cladding for the adiabatic mixing region.

16 Claims, 5 Drawing Sheets

OPTICAL SPLITTER/COMBINER WITH AN ADIABATIC MIXING REGION

TECHNICAL FIELD

This invention relates to an optical splitter/combiner and, more particularly, to an optical splitter/combiner with an adiabatic mixing region that gradually changes shape without abrupt changes.

BACKGROUND OF THE INVENTION

In many optical local area networks (LAN) and optical backplanes that have a bus-type architecture, an optical repeater receives and combines optical signals from optical transmitters in system nodes as well as amplifies and individually retransmits the signals to optical receivers in the system nodes. System nodes transmit and receive optical signals via interconnecting optical fibers through the optical repeater. Specifically, the optical repeater combines optical signals received via the optical fibers and redistributes these optical signals via optical fibers back to the system nodes. The optical repeater has an optical splitter and an optical combiner. The combiner combines the received optical signals, and the splitter redistributes the combined optical signal.

The U.S. Patent application of L. L. Blyler, Jr., et al., Ser. No. 252,091, filed Sept. 30, 1988, and assigned to the same Assignees as the present application, discloses a passive optical device for performing the functions of an optical splitter or combiner. The disclosed device optically interconnects substantially circular bundles of optical fibers; however, the device cannot optically interconnect a linear array of fibers to a circular bundle of optical fibers or to a single large optical fiber without large optical losses. An example of an linear array of optical fibers is the silicon etched Multi-fiber Array Connector (MAC) manufactured by AT&T. Such linear arrays are important because of ease of manufacturing and physical routing in system applications.

SUMMARY OF THE INVENTION

The aforementioned problem is solved and a technical advance is achieved in the art by an optical splitter/combiner having an adiabatic mixing region for optically interconnecting a plurality of optical fibers. An adiabatic mixing region is a region whose shape gradually varies without any abrupt changes. The changes in shape of the adiabatic mixing region are purposely gradual so as to introduce very little optical loss due to scattering or reflections and yet assures a uniform and unbiased lumination of receiving optical fibers. Advantageously, the shape of the adiabatic mixing region is varied along the longitudinal axis of the adiabatic mixing region so as to minimize the change in the cross-sectional area of the adiabatic mixing region. By minimizing the change in cross-sectional area, the number of light modes can be substantially preserved from a transmitting end to a receiving end of the adiabatic mixing region.

In a first preferred embodiment of the invention, an optical splitter/combiner is fabricated by utilizing two subassemblies which when fitted together form an adiabatic mixing region. This formed mixing region is adapted to accepting a linear array of optical fibers in one end and a single optical fiber in the other end. The core area of the optical fibers in one end is not necessarily equivalent to those of the other end but instead are sized to ensure the relatively efficient transfer of optical energy. Advantageously, the adiabatic mixing region is filled with resin, and the numerical apertures of the optical fibers and the resinfilled mixing region are substantially matched. The subassemblies form an optical cladding for the adiabatic mixing region.

In a second preferred embodiment of the invention, two subassemblies form an adiabatic mixing region that is adapted to accepting a linear array of optical fibers in one end and another linear array of optical fibers in the other end. The dimensions of the two linear arrays are not identical.

In a third preferred embodiment of the invention, two subassemblies form an adiabatic mixing region that is adapted to accepting a circular array of optical fibers in one end and another circular array of optical fibers in the other end. The dimensions of the two circular arrays are not identical.

Other and further aspects of the present invention will become apparent during the course of the following description and by reference to the accompanying drawing.

BRIEF DESCRIPTION OF THE DRAWING

Referring now to the drawing.

DETAILED DESCRIPTION

Figure 1:
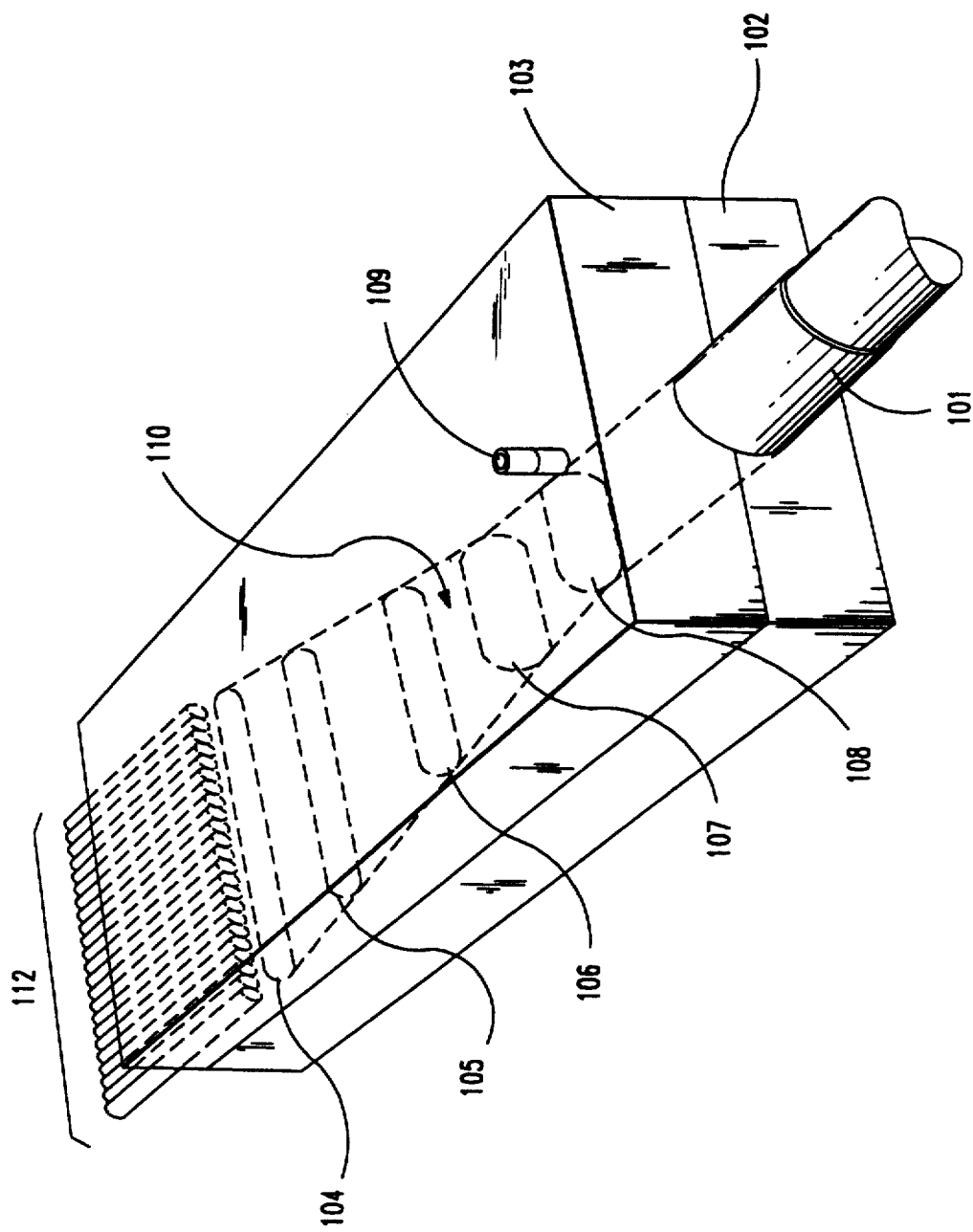
FIG. 1 illustrates a first embodiment of an optical splitter/combiner in accordance with the present invention.

In accordance with the invention, FIG. 1 illustrates splitter-combiner 100 which has an adiabatic mixing region within optical mixing core 110 for interconnecting optical fibers 112 and optical fiber 101. An adiabatic mixing region is a region whose shape gradually varies without any abrupt changes. The changes in shape of optical mixing core 110 are purposely gradual in order to introduce little optical loss due to scattering or reflections and yet assures a uniform and unbiased lumination of receiving optical fibers. Also, the gradual change in shape assures uniform mixing of all incoming signals. The outer surface of optical mixing core 110 is formed by subassemblies 102 and 103. The surfaces of these subassemblies that form optical mixing core 110 are optically finished and provide an optical cladding and rigid structure for optical mixing core 110. Optical mixing core 110 is of a material that can either be numerical aperture matched or refractive index matched to optical fibers 112 and optical fiber 101.

Advantageously, in the preferred embodiment, the numerical aperture matching is done so that the numerical aperture of optical mixing core 110 varies no more than 20% from the numerical aperture of optical fibers 112 and optical fiber 101. Advantageously, one end of optical mixing core 110 substantially matches the shape of optical fibers 112. Similarly, the other end of optical mixing core 110 substantially matches the shape of optical fiber 101. In general, the cross-sectional areas of optical fibers 112 should be plus or minus 50% of the cross-sectional area of optical fiber 101.

In one preferred embodiment, optical fibers 112 consist of 20 fibers with each fiber being 230 microns in diameter; and optical fiber 101 is 1,050 microns in diameter having a 1000 micron diameter core. Optical fiber core 101 is a fluorinated acrylic polymer-clad poly(methyl methacrylate) fiber. Advantageously, optical fibers 112 are fluoroacrylate polymer-clad silica fibers having a 200 micron diameter core and a cladding that is 230 microns on the outside diameter. Optical fibers 112 and 101 could alternately be the ends of glass-clad fibers with most of the cladding removed by etching techniques known in the art. Optical fibers 112 are positioned together as a linear array and then a buffer is placed over them. The buffer does not cover the portion of optical fibers 112 inserted into subassemblies 102 and 103. The shape of the resulting linear array is substantially an oblated circle. Subassemblies 102 and 103 are made of Teflon ® FEP and are formed by injection molding. The optical finish on the surfaces of subassemblies 102 and 103 which form optical mixing core 110 is achieved by molding subassemblies 102 and 103 against optically finished metal molds.

Figure 2:
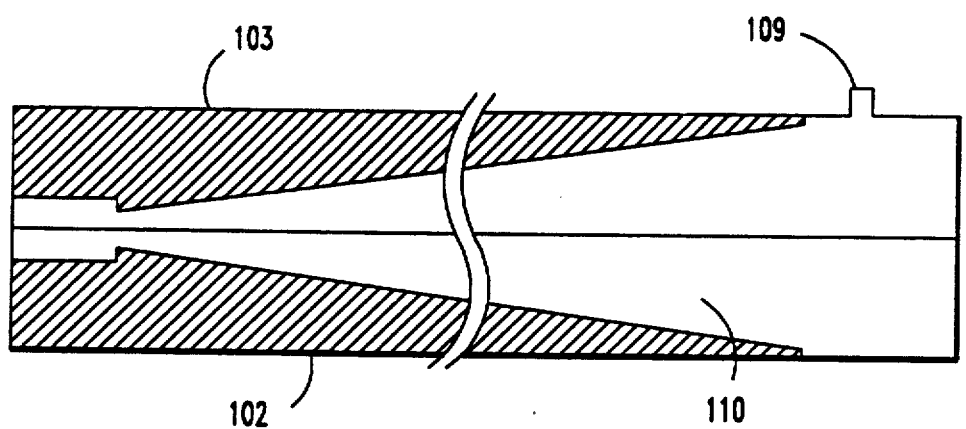
FIG. 2 illustrates a cross-sectional view of the optical splitter-combiner.
Figure 3:
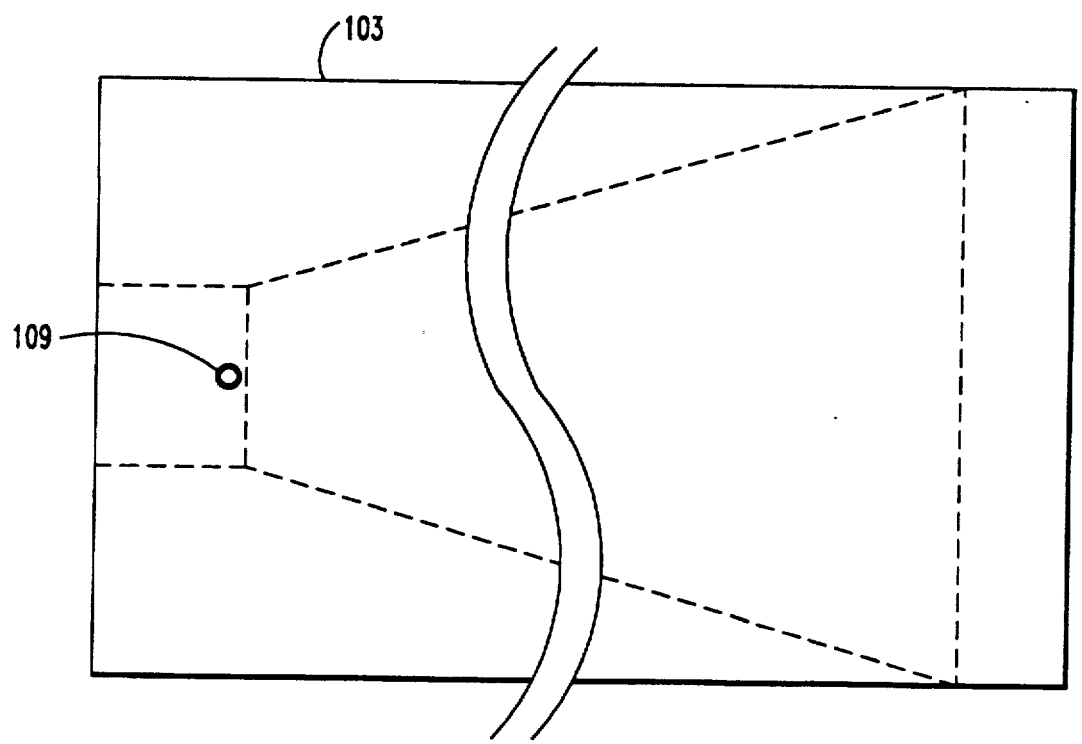
FIG. 3 illustrates a top view of subassembly 103.

FIG. 2 illustrates a side view of subassemblies 102, and 103, and FIG. 3 illustrates a top view of subassembly 103. The preferred embodiment illustrated in FIGS. 1, 2, and 3 is fabricated in the following manner. As illustrated in FIG. 2, stops 201 and 202 provide an alignment point for optical fibers 112 and optical fiber 101, respectively. After subassemblies 102 and 103 are assembled, optical fibers 112 and optical fiber 101 are inserted into the housing formed by subassemblies 102 and 103 until the fibers contact stops 201 and 202, respectively. Not illustrated in the drawing is the strain relief provided for optical fibers 112 and optical fiber 101 which holds optical fibers 112 and optical fiber 101 against the subassemblies. After the optical fibers are inserted into the assembly formed by subassemblies 102 and 103, optical mixing core 110 is filled with a resin which may be advantageously a 2-part silicone resin (KE103) manufactured by the Shin-Etsu Chemical Company. These materials include a vinyl-terminated poly(dimethylsiloxane) material and a proprietary silane cross-linking material catalysed by a platinum compound. The two parts are mixed in a 20-1 ratio by weight as instructed by the manufacturer and stirred with a magnetic stirrer. The material is then degassed for 3 minutes under a one Torr vacuum; after degassing, the material is inserted through filling hole 109 into optical mixing core 110. The material is injected into the mixing core until optical mixing core 110 is entirely filled.

Figure 4:
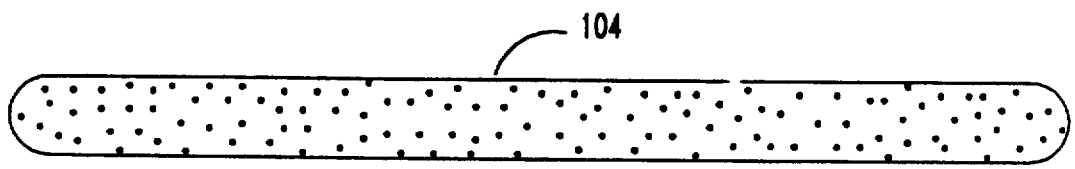
FIGS. 4, 5, and 6 illustrate cross-sectional views as depicted in FIG. 1.
Figure 5:
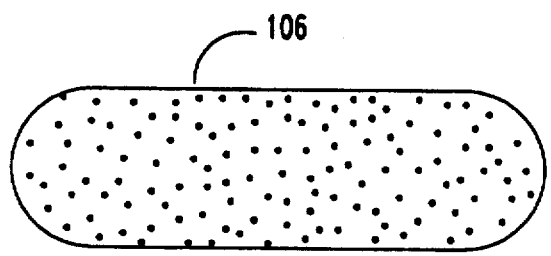
Figure 6:
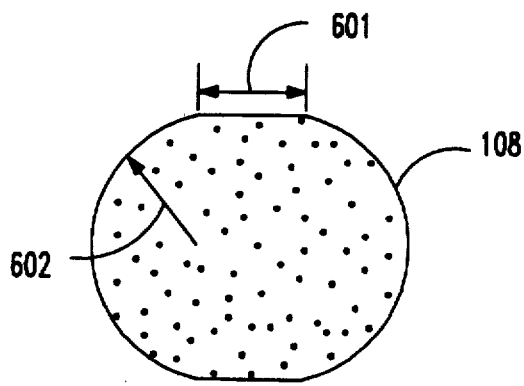

The shape of optical mixing core 110 is illustrated in FIGS. 4, 5, and 6 as cross-sectional views 104, 106, and 108, as respectively. The latter cross-sectional views are oblated circles. In cross-section 108 as illustrated in FIG. 6, the two halves of the oblated circle have a radius (r) of radius 602 and are joined by straight lines having a width (w) of width 601. The shape of optical mixing core 110 is mathematically defined as follows:

$$r = \frac{RL}{Cr_o} \quad (1)$$

$$w = \frac{\pi(R^2 - r^2)}{2rX} \quad (2)$$

where R is the radius of the core of optical fiber 101, $r_o$ is the radius of the core of one of optical fibers 112, L is the position along splitter/combiner 100, C is a constant which may advantageously be 500, r is the varying radius illustrated in FIG. 6 as radius 602, and w is the varying width illustrated in FIG. 6 as width 601. The initial value of L is defined by the following equation:

$$L = \frac{Cr_o}{\sqrt{1 + 4X(n-1)/\pi}}$$

where n is the number of fibers in optical fibers 112. The final value of L is given by the following equation:

$$L = Cr_o$$

The value of X is defined by the following equation:

$$X = \frac{\pi(R^2 - r_o^2)}{2r_o w}$$

In the embodiment illustrated in FIG. 1, optical fibers 112 have a cross-sectional area substantially equal to that of the cross-sectional area of optical fiber 101. Other embodiments are possible where the cross-sectional areas of optical fibers 112 and optical fiber 101 are not substantially equal. For the cases where optical fiber 101 has a cross-sectional area not equal to the cross-sectional area of optical fibers 112, the shape of optical mixing core 110 is still mathematically defined by equations 1 and 2.

Figure 7:
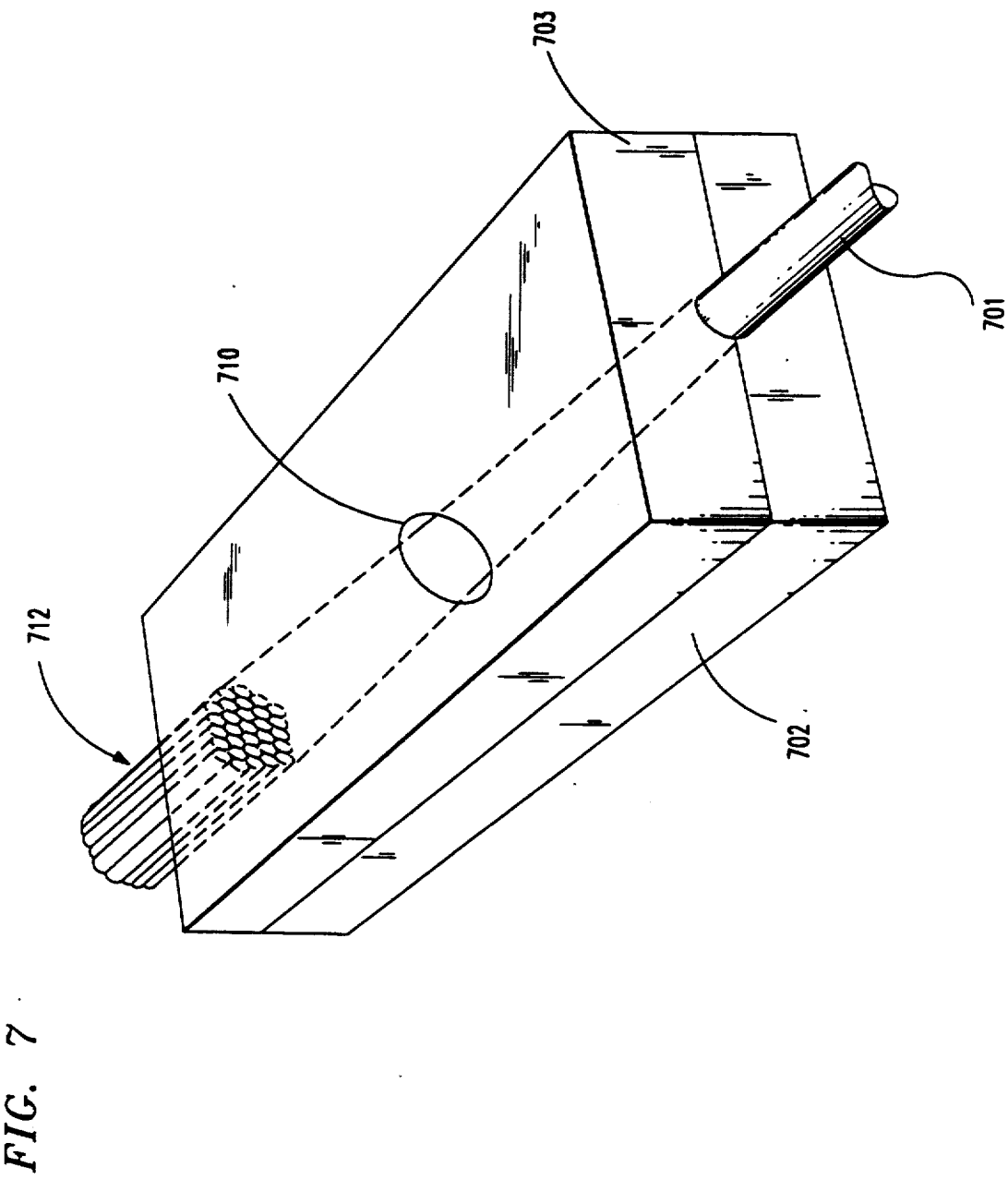
FIG. 7 illustrates a second embodiment in accordance with the invention.

FIG. 7 illustrates another embodiment in accordance with the invention where a substantially circular bundle of optical fibers 712 is interconnected with optical fiber 701, and optical mixing core 710 formed by subassemblies 702 and 703 has an adiabatic shape. The shape of optical mixing core 710 is mathematically defined as follows:

$$r = \frac{RL}{Cr_o}$$

where R is the radius of optical fiber 701, $r_o$ is the radius of circular bundle 712, L is the position along splitter/combiner 700, C is a constant which may advantageously be 500, r is the varying radius. The initial value of L is defined by the following equation:

$$L = \frac{Cr_o}{\sqrt{1/X}}$$

The final value of L is given by the following equation:

$$L = Cr_o$$

The value of X is defined by the following equation:

$$X = r_o^2/R^2$$

where $0.5 \leq X \leq 1.5$.

Figure 8:
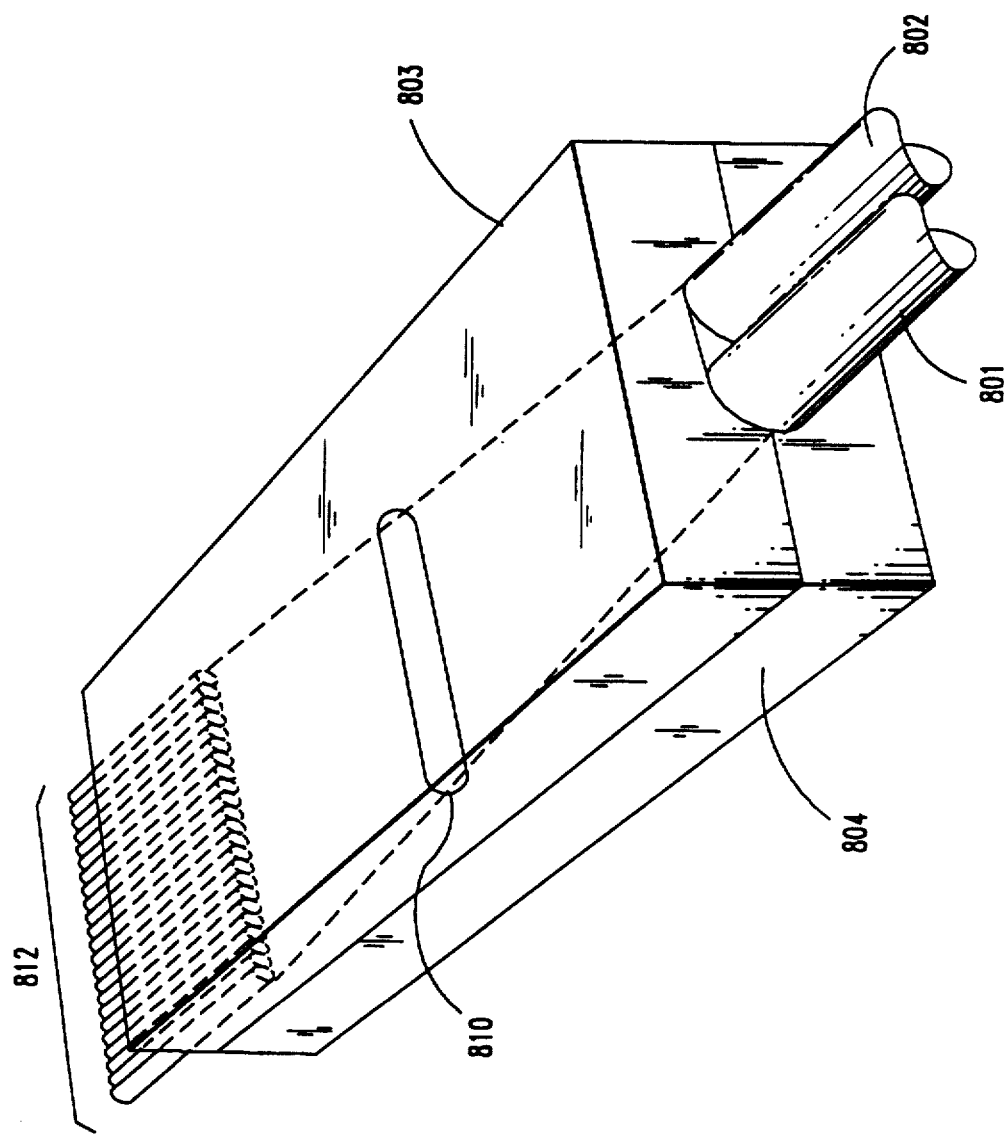
FIG. 8 illustates a third embodiment in accordance with the invention.

Splitter-combiner 100 of FIG. 1 and splitter-combiner 700 of FIG. 7 illustrate arrays or groups of optical fibers interconnected with an array or group of optical fibers in which the group consists only of one optical fiber. Applications arise where it is desirable for more than one optical fiber to be interconnected to an array of optical fibers. FIG. 8 illustrates an embodiment in accordance with the invention which interconnects optical fibers 801 and 802 with a linear array of optical fibers 812. Subassemblies 803 and 804 form optical mixing core 810.

Other embodiments of the invention using different materials than previously described are possible by one skilled in the art using the following principles. The numerical aperture of optical mixing core 110 of FIG. 1 is determined by the refractive index of the mixing region and the refractive index of the surrounding cladding (e.g., subassemblies 102 and 103). (Numerical aperture is defined in N. S. Kapany, *Fiber Optics, Principles and Applications*, Academic Press, New York, 1967, pp. 7-9.) Flexibility in adjusting the numerical aperture is generally attained by adjusting the composition of the mixing core material. Polymers for the mixing core material which yield a wide range of refractive indices are available and allow the matching of numerical apertures. For example, resins such as silicones, e.g., dimethyl siloxanes, acrylics, e.g., poly(methyl methacrylate), polyesters, polyurethanes and epoxies yield refractive indices in the range of 1.39-1.57. Materials available for use as the cladding (subassemblies 102 and 103) are polymers, e.g., perfluorinated ethylene-propylene copolymer and poly(vinylidine fluoride), poly(4-methyl penetene-1), poly(methyl methacrylate), and polyethylene.

It is to be understood that the above-described embodiments are merely illustrative of the principles of the invention and that other arrangements may be devised by those skilled in the art without departing from the spirit and scope of the invention. In particular, a splitter/combiner in accordance with the invention could interconnect other arrays of optical fibers. For example, a circular array of optical fibers could be interconnected with one square optical fiber, or a linear array of square fibers could be interconnected with a circular optical fiber. Further, an array of square fibers could be interconnected with a square fiber or a round fiber.

We claim:

1. An optical device for transmitting optical signals between a first group of optical fibers and said first group of optical fibers are positioned in an linear array having a first cross-sectional shape and a second group of optical fibers and said second group of optical fibers having a second cross-sectional shape and said first cross-sectional shape being different than said second cross-section shape, and comprising:
   an optical mixing core;
   an optical cladding surrounding said optical mixing core;
   a first end of said optical mixing core having an oblately circular shape substantially matching said first cross-sectional shape and said first group of optical fibers being connected to said first end;
   a second end of said optical mixing core substantially matching said second cross-sectional shape and said second group of optical fibers being connected to said second end; and
   the cross-sectional shape of said optical mixing core gradually changing from said first end to said second end whereby an mixing region is formed for communicating said optical signals.

2. The device of claim 1 wherein said gradually changing shape of said optical mixing core varies so as to minimize the change in cross-sectional area of said optical mixing core along the longitudinal axis of the optical mixing core.

3. The device of claim 2 wherein said first and second cross-sectional shapes are within 50% of each other in area.

4. The device of claim 1 wherein said optical cladding is a rigid structure and said optical mixing core is formed within said rigid structure.

5. The device of claim 4 wherein said second group of optical fibers consists of one optical fiber and said second end is circular in shape; and
   said gradually changing shape varies from an oblated circular shape to a circular shape from said first end to said second end.

6. The device of claim 5 wherein said optical mixing core has a numerical aperture within 20% of the numerical apertures of said first and second groups of optical fibers.

7. An optical device for transmitting optical signals between a first group of optical fibers and said first group of optical fibers having a first cross-sectional shape and a second group of optical fibers and said second group of optical fibers having a second cross-sectional shape, comprising:
   said first group of optical fibers are positioned in a linear array;
   said second group of optical fibers are positioned in a linear array and said second group of optical fibers having fewer optical fibers than said first group of optical fibers;
   an optical mixing core;
   an optical cladding surrounding said optical mixing core;
   a first end of said optical mixing core substantially matching said first cross-sectional shape and said first group of optical fibers being connected to said first end;
   said first end is oblately circular in shape and has a radius substantially equal to the radius of a optical fiber of said first group of optical fibers;
   a second end of said optical mixing core substantially matching said second cross-sectional shape and said second group of optical fibers being connected to said second end;
   said second end is oblately circular in shape and has a radius substantially equal to the radius of a optical fiber of said second group of optical fibers; and
   the cross-sectional shape of said optical mixing core gradually changing from said first end to said second end whereby a mixing region is formed for communicating said optical signals.

8. The device of claim 7 wherein said gradually changing shape of said optical mixing core varies so as to minimize the change in cross-sectional area of said optical mixing core along the longitudinal axis of the optical mixing core.

9. The device of claim 8 wherein said first and second cross-sectional shapes are within 50% of each other in area.

10. The device of claim 8 wherein said optical cladding is a rigid structure and said optical mixing core is formed within said rigid structure.

11. The device of claim 10 wherein said optical mixing core has a numerical aperture within 20% of the numerical apertures of said first and said second groups of optical fibers.

12. An optical device for transmitting optical signals between a first group of optical fibers and said first group of optical fibers having a first cross-sectional shape and a second group of optical fibers and said second group of optical fibers having a second cross-sectional shape, comprising:

said first group of optical fibers are positioned in a linear array;

said second group of optical fibers are positioned in a linear array and each of said second group of optical fibers having an individual radius different than an individual radius of each of said first group of optical fibers;

an optical mixing core;

an optical cladding surrounding said optical mixing core;

a first end of said optical mixing core substantially matching said first cross-sectional shape and said first group of optical fibers being connected to said first end;

said first end is oblately circular in shape and has a radius substantially equal to the radius of a optical fiber of said first group of optical fibers;

a second end of said optical mixing core substantially matching said second cross-sectional shape and said second group of optical fibers being connected to said second end;

said second end is oblately circular in shape and has a radius substantially equal to the radius of a optical fiber of said second group of optical fibers; and the cross-sectional shape of said optical mixing core gradually changing from said first end to said second end whereby a mixing region is formed for communicating said optical signals.

13. The device of claim 12 wherein said first and second cross-sectional shapes are within 50% of each other in area.

14. The device of claim 13 wherein said gradually changing shape of said optical mixing core varies so as to minimize the change in cross-sectional area of said optical mixing core along the longitudinal axis of the optical mixing core.

15. The device of claim 14 wherein said optical cladding is a rigid structure and said optical mixing core is formed within said rigid structure.

16. The device of claim 15 wherein said optical mixing core has an numerical aperture within 20% of the numerical apertures of said first and said second groups of optical fibers.

* * * * *